(12) United States Patent
Cha et al.

(10) Patent No.: US 7,427,052 B2
(45) Date of Patent: Sep. 23, 2008

(54) LEG ASSEMBLY FOR HOME APPLIANCE

(75) Inventors: Woong Kil Cha, Changwon-si (KR); Bo Yon Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 10/528,831

(22) PCT Filed: May 13, 2004

(86) PCT No.: PCT/KR2004/001124

§ 371 (c)(1),
(2), (4) Date: Mar. 23, 2005

(87) PCT Pub. No.: WO2004/102061

PCT Pub. Date: Nov. 25, 2004

(65) Prior Publication Data

US 2006/0131466 A1    Jun. 22, 2006

(30) Foreign Application Priority Data

May 13, 2003  (KR) .................. 10-2003-0030252
May 13, 2003  (KR) .................. 10-2003-0030253

(51) Int. Cl.
*F16M 11/00*  (2006.01)

(52) U.S. Cl. .................. 248/188.8; 248/616; 248/638; 16/42 R (58) Field of Classification Search ............. 248/188.8, 248/677, 188.2, 188.4, 616, 638; 16/42 R
See application file for complete search history.

(56) References Cited

U.S. PATENT DOCUMENTS

| | | | | |
|---|---|---|---|---|
| RE14,964 E | * | 10/1920 | Anderson | 248/616 |
| 2,513,193 A | * | 6/1950 | Miller | 16/38 |
| 2,699,567 A | * | 1/1955 | Kramcsak, Jr. | 16/42 R |
| 2,739,774 A | * | 3/1956 | Crede | 248/616 |
| 2,767,944 A | * | 10/1956 | Moore | 248/634 |
| 2,890,545 A | * | 6/1959 | Fiddler | 248/188.4 |
| 2,921,760 A | * | 1/1960 | Wheeler | 248/615 |
| 3,592,423 A | * | 7/1971 | Mui | 248/616 |
| 3,722,026 A | * | 3/1973 | Wilhelmi | 16/42 T |
| 5,010,621 A | * | 4/1991 | Bock | 16/39 |
| 5,988,574 A | * | 11/1999 | Podgorski et al. | 248/188.4 |
| 6,138,979 A | * | 10/2000 | Morman | 248/638 |

FOREIGN PATENT DOCUMENTS

| | | |
|---|---|---|
| DE | 4016080 | 11/1991 |
| DE | 29602939 | 5/1996 |
| JP | 9-126391 | 5/1997 |
| KR | 1999-0056888 | 7/1999 |

* cited by examiner

*Primary Examiner*—Anita M King
(74) *Attorney, Agent, or Firm*—McKenna Long & Aldridge LLP (57) ABSTRACT

Disclosed is a leg assembly for electric home appliances for supporting an electric home appliance such as a washing machine and a clothes dryer. The leg assembly in accordance with the present invention includes, a leg bolt (100) having a screw (110) coupled with the electric home appliance and a head (120) provided at an end of a screw (110) a pad made of a soft material and closely adhered to the head (120) an being in contact with a floor; and at least one holder (300) being coupled with the head (120) for fixing the head (120) and the pad (200) by pressing the pad (200) toward the head (120).

47 Claims, 11 Drawing Sheets

FIG. 1

RELATED ART

LEG ASSEMBLY FOR HOME APPLIANCE

TECHNICAL FIELD

The present invention relates to a leg assembly for electric home appliances, and more particularly, to a leg assembly for supporting electric home appliances such as a washing machine and a clothes dryer.

BACKGROUND ART

Legs for electric home appliances are generally provided at corners of electric home appliances for supporting the appliance. In general, installation condition largely influences to lifetime and reliability of the appliance such as a washing machine, a clothes dryer, a refrigerator, and a dish washer. The legs applied to the electric home appliances are formed in a screw structure for easily controlling height of each home appliance.

Figure 1:
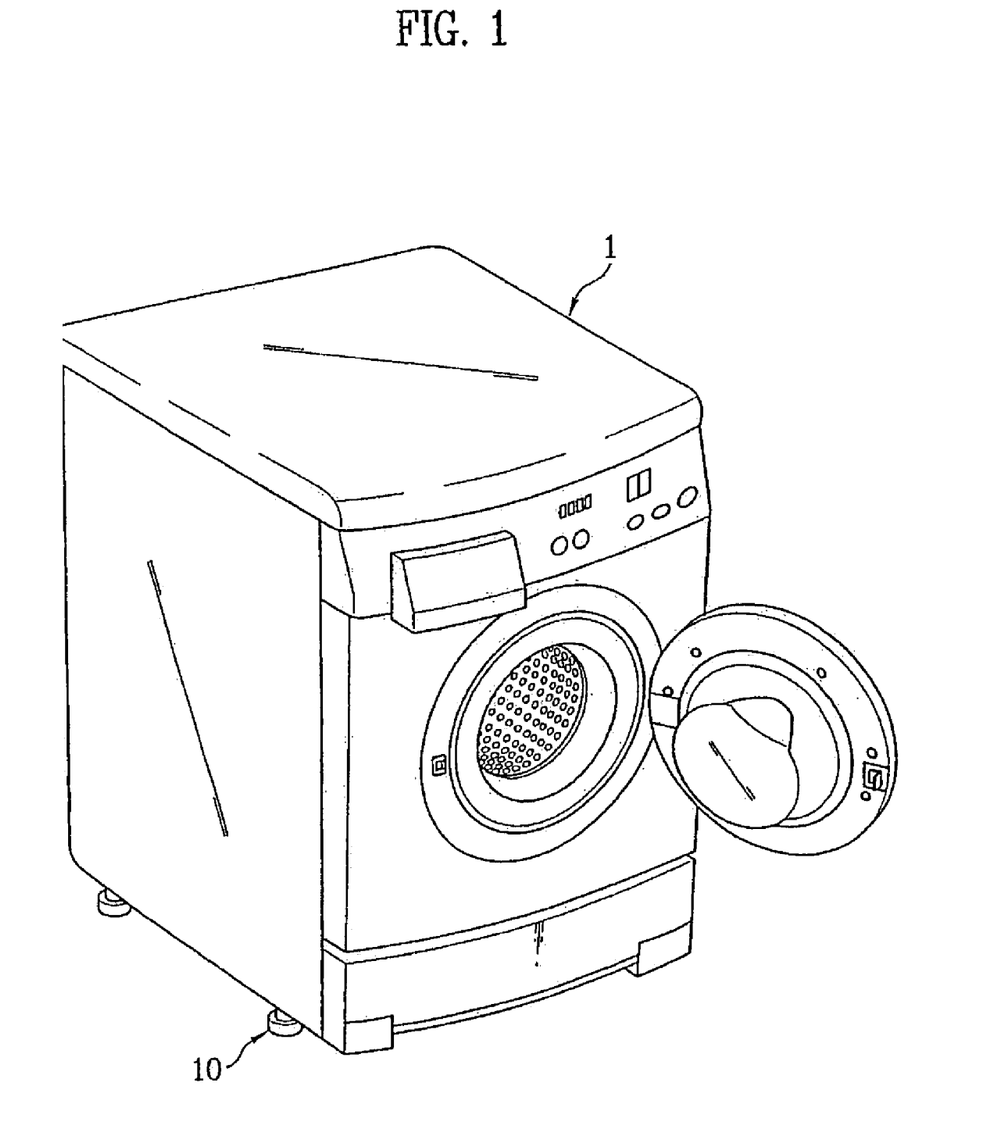
FIG. 1 illustrates a perspective view showing the leg provided on a home appliance.
Figure 2:
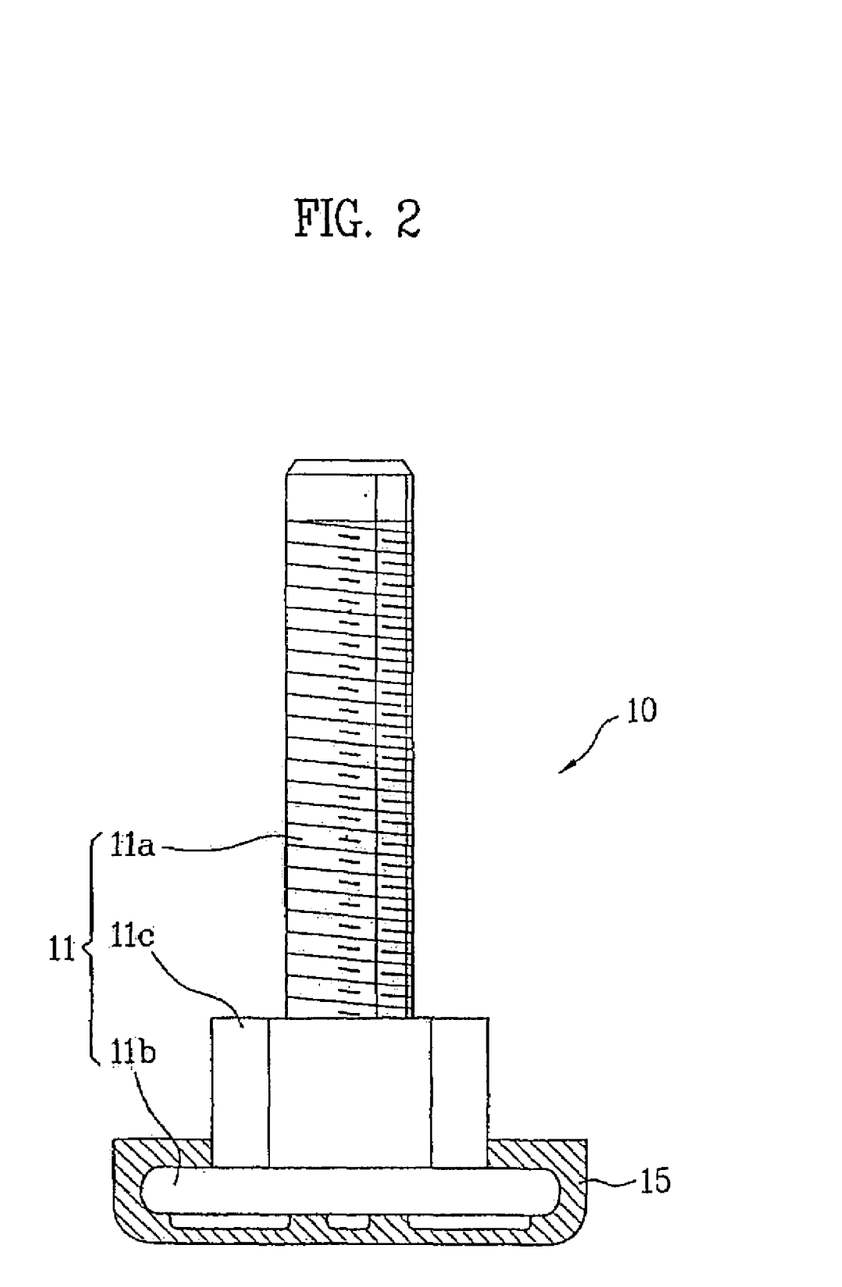
FIG. 2 illustrates a cutaway view showing a preferred embodiment of a typical leg.

In FIGS. 1 and 2 illustrate an example showing a leg 10 formed in a screw form is applied to a drum washing machine. Hereinafter, the structure of the leg 10 will be described referring to the drawings.

Referring to FIG. 2, a traditional leg 10 includes a pad 15 covering a long screw 11a and a leg bolt having a flat head 11b provided at an end of the screw 11a. In this case, the flat head 11b is formed in a round plate form for evenly dispersing weight of a home appliance 1 to a floor. The pad 15 is generally made of a butyl rubber, and molded to cover the flat head 11b through a molding process.

Between the screw 11a and the flat head 11b, a head 11c having an angled outer circumference as illustrated in FIG. 2. When the head 11c is provided, a worker can easily controls height of the leg 10 by using tools when installing the home appliance 1.

Meanwhile, for producing a typical leg 10 having above-mentioned structure, a glue is sprayed onto the flat head 11b of a leg bolt 11, and the pad 15 including the butyl rubber is shaped on a surface of the flat head 11b through the molding process. As aforementioned, the typical leg 10 has a problem of low productivity in order that a process for producing the typical leg 10 is very complex.

In addition, there is a kind of bur occurred when the butyl rubber is leaked and solidified between the metallic moulds on the outer circumference of the pad 15 during shaping. The bur formed during the molding process makes a bad outer appearance of the pad 15 as well as lowers aesthetic beauty of the leg 10.

Furthermore, because the pad 15 has no angled outer surface, and the material of which is very soft, a hand of the worker can be easily slipped from the pad when the worker rotates the pad 15 for coupling the leg 10 to the home appliance 1 or adjusting the height of the leg. Therefore, the typical leg 10 has a problem of lowering operation efficiency of the worker.

DISCLOSURE OF INVENTION

Accordingly, the present invention is directed to a leg assembly for electric home appliances that substantially obviates one or more problems due to limitations and disadvantages of the related art.

An object of the present invention is to provide a leg assembly for electric home appliances with an improved structure for improving efficiency during mounting and productivity during manufacturing.

Another object of the present invention is to provide a leg assembly for electric home appliances with an improved structure for improving an external appearance so as to have a smooth and beautiful appearance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the leg assembly for electric home appliances includes a leg bolt having a screw coupled with the electric home appliance and a head provided at an end of a screw, a pad made of a soft material and closely adhered to the head and being in contact with a floor, and at least one holder being coupled with the head for fixing the head and the pad by pressing the pad toward the head.

In this case, the head includes a flat head provided at an end of the screw, and a platform projected from a center of the flat head. The flat head is formed in a round plate form.

The leg assembly for electric home appliances in accordance with the present invention further includes an angled head provided between the screw and the head and having an angled outer circumferential surface.

Meanwhile, the pad includes an edge fixed to the head by the holder, and a center more projected than the edge and being in contact with the floor.

The leg assembly for electric home appliances further includes at least one groove provided on at least one of either the head or the pad, and a projection provided on at least one of either the head or the pad, and inserted into the groove so as to prevent the pad from being rotated on the head. In this case, the groove and the projection are provided in a long form, or separately provided from a rotation center of the leg bolt.

For preventing the holder from being rotated on the head, the leg assembly for electric home appliances in accordance with the present invention includes at least one groove provided on at least one of either a circumferential surface of the head or an inner surface of the holder, and at least one projection provided on at least one of either the circumferential surface of the head or the inner surface of the holder, and inserted into the groove. In this case, the groove or the projection may be provided between the hooks Meanwhile, in another aspect of the present invention, the holder includes a though hole passing through a center of the pad, a bottom closely adhered to the edge of the pad, and a plurality of hooks extended from the bottom and caught by a side of the head and supported in a state that the bottom presses the edge.

In this case, the hook may be projected form the inner surface of the side wall to the inner space of the holder, and it is desirable that the distance between the bottom and the hook is smaller than a sum of thickness of the edge and thickness of the head.

The holder further includes at least one projection projected from the bottom for pressing the edge with a large pressure. In this case, a plurality of the projections is arranged around the through hole at same interval.

Meanwhile, it is desirable that the holder includes an angled outer circumferential surface. The holder further comprises an opening provided at a coupling part of the bottom and the side wall for easily opening a portion of the side wall, the portion having the hook, when the holder is assembled to the head. In this case, it is desirable that the opening is provided on a perpendicular projection area of the hook.

In the mean time, in another aspect of the present invention, the holder the holder includes an inner holder and an outer holder assembled at both sides of the head and fixing the pad to the head. In this case, the inner holder is provided to cover the edge of the pad, and a side of the outer holder supports the head and the inner holder.

The leg assembly for electric home appliances in accordance with the present invention includes at least one groove provided on at least one of either the circumferential surface of the head or the inner surface of the inner holder, and at least one projection provided on at least one of either the circumferential surface of the head or the inner surface of the inner holder.

It is desirable that the inner holder is made of a hard material and has an angled outer circumferential surface. In this case, the outer holder is made of a hard material and has the angled inner circumferential surface of the inner holder, the angled inner surface being engaged with the angled outer circumferential surface of the inner holder, so as to prevent the outer holder from being rotated on the inner holder. Meanwhile, the outer holder may have an angled outer circumferential surface.

In the mean time, the inner holder includes a through hole through which the center of the pad passes through in a middle thereof, a bottom covering the edge of the pad, and a side wall extended from a circumference of the bottom and covering the outer circumferential surface of the pad and the head.

The inner holder further comprises at least one projection projected from the bottom for pressing the edge with a large pressure. A plurality of projections is arrayed around the through hole at same intervals.

Meanwhile, the outer holder includes a bottom having a through hole through which the screw passes in a center thereof, and being supported by a side of the head; and a side wall extended from the circumferential surface of the bottom and having a plurality of hooks being supported by the inner holder in a state that the inner holder presses the edge of the pad.

The hook is projected from the inner surface of the side wall to the inner space of the outer holder. It is desirable that distance between the bottom and the hook is smaller than a sum of thickness of the edge and thickness of the head.

The outer holder further includes at least one opening provided at a coupling part of the bottom and the side wall. The opening is provided on a perpendicular projection area of the hook.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

First, FIG. 3 to 6C illustrates a leg assembly in accordance with the present invention and FIG. 7 to 10B illustrates the leg assembly in accordance with the present invention. As illustrated in the drawing, the leg assembly in accordance with the present invention includes a leg bolt 100 coupled with a home appliance (not shown), a pad 200 closely adhered to a side of the leg bolt 100, and at least one holder 300 fixed to the leg bolt 100.

In this case, although the holder applied to the leg assembly in accordance with the first embodiment of the present invention has same technical characteristics in many ways as the holder applied to the leg assembly in accordance with the second embodiment of the present invention.

Therefore, the leg assembly in accordance with the first embodiment of the present invention will be described first, and then the leg assembly in accordance with the second embodiment of the present invention will be described later centering around differences from the leg assembly in the first embodiment of the present invention.

First Embodiment

Figure 3:
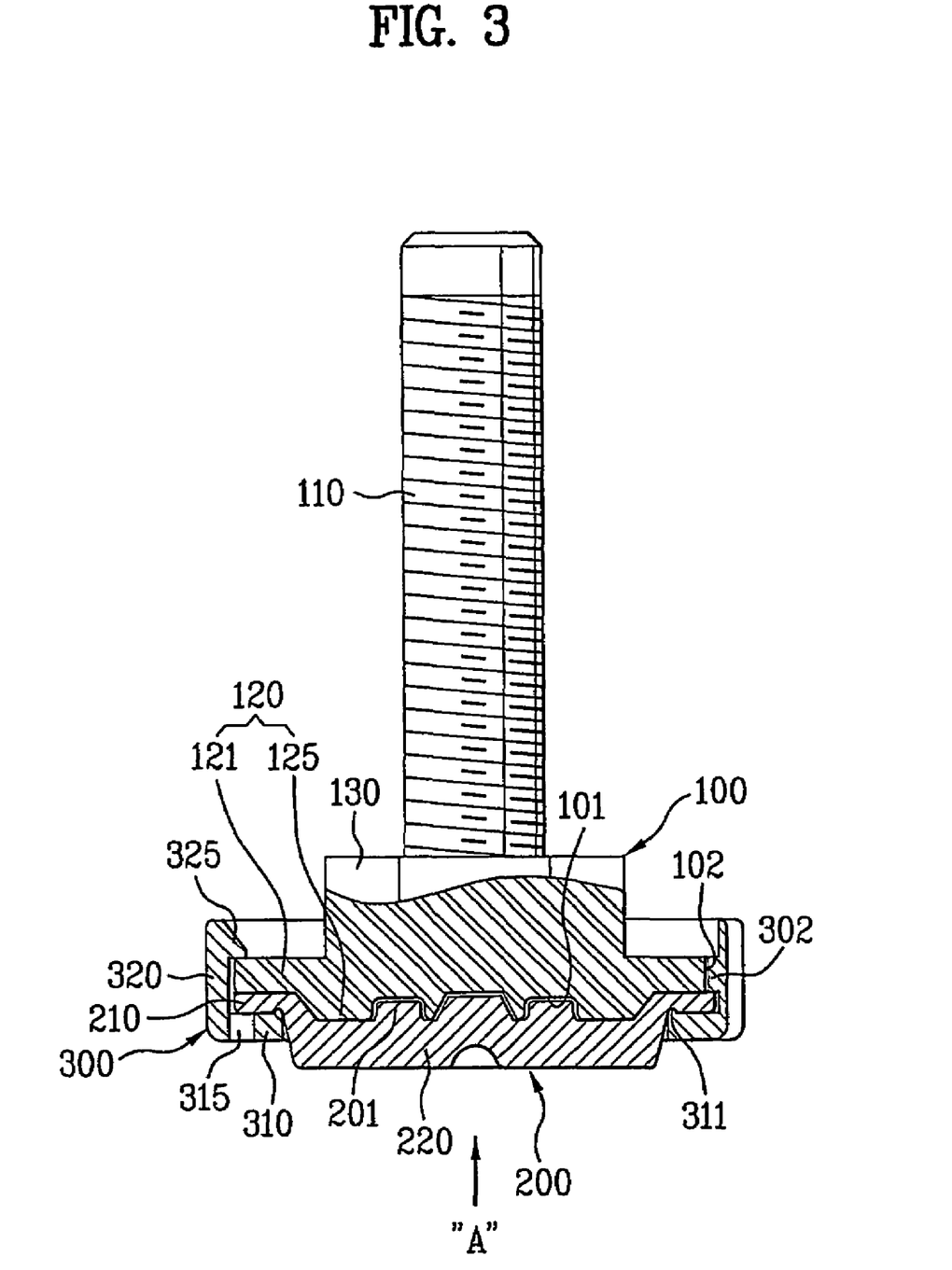
FIG. 3 illustrates perspective view showing a leg assembly in accordance with a first preferred embodiment of the present invention.
Figure 5:
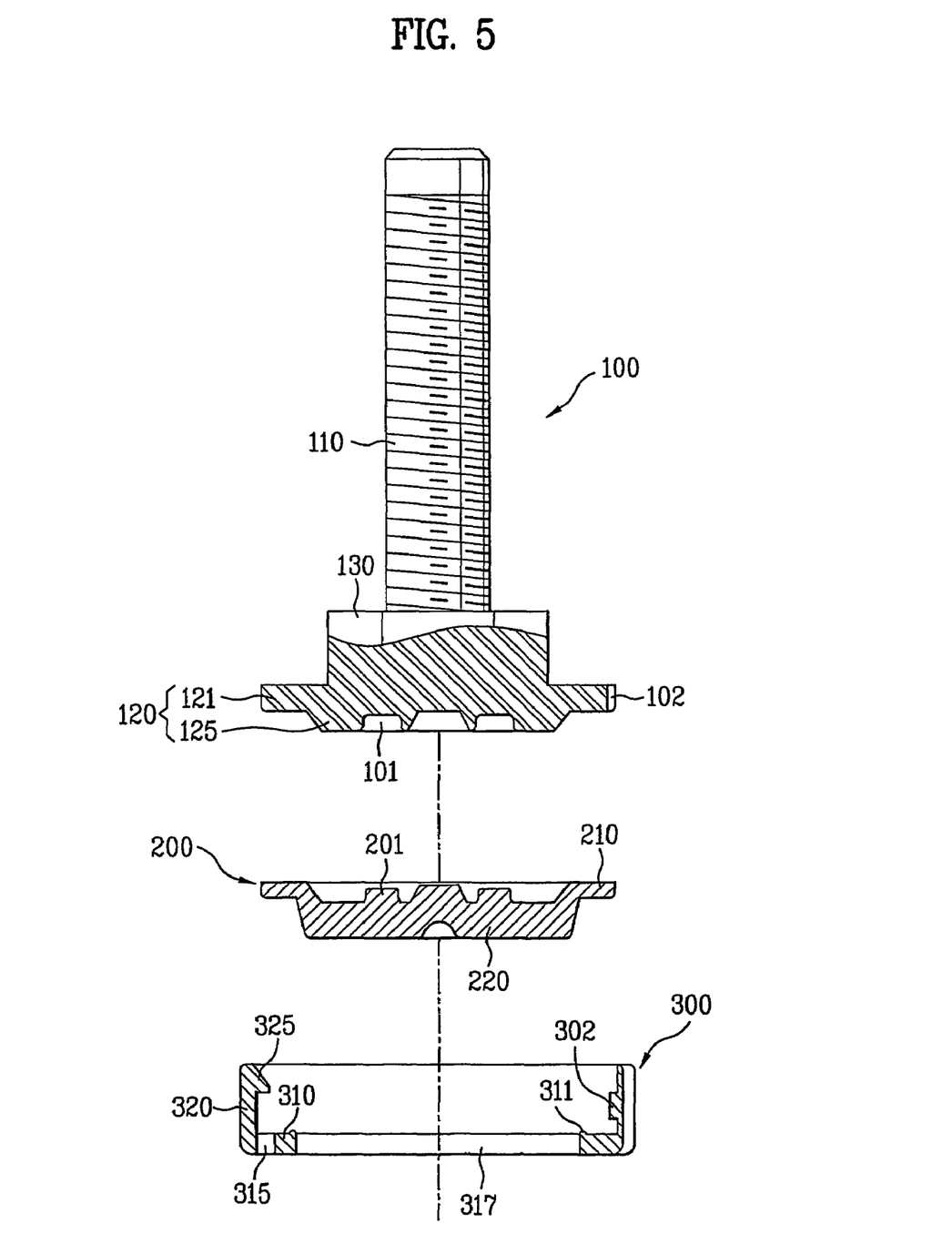
FIG. 5 illustrates an exploded cross-sectional view of the leg assembly in FIG. 3.
Figure 6A:
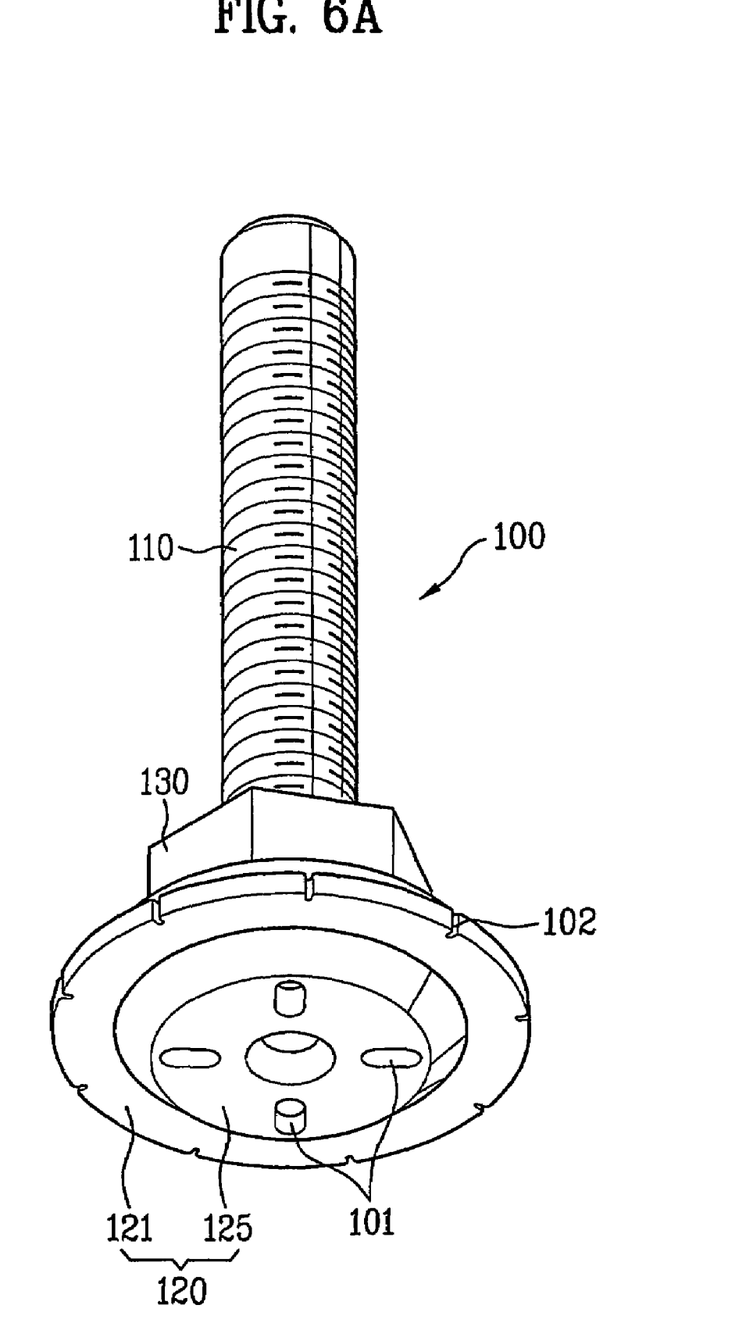
FIG. 6A illustrates a perspective view showing a leg bolt of the leg assembly in FIG. 3.

The leg bolt 100 is coupled to a home appliance (not shown) and includes a long screw 110 and a head 120 as illustrated in FIGS. 3, 5 and 6A.

In this case, the screw 110 is coupled with a lower edge of the home appliance such that height of the leg bolt 100 is adjusted by rotating the screw 110.

The head 120 is provided at an end of the screw 110, and includes a flat head 121 and a platform 125. In this case, the flat head 121 is formed in a round plate form and the platform 125 is projected from the flat head 121 in an opposite direction of a forwarding direction of the screw 110.

Furthermore, an angled head 130 is further included between the head 120 and the screw 110. The angled head 130 is includes an angled outer circumference as illustrated in FIG. 6A. Therefore, when the angled head is provided, a worker can easily rotate the leg bolt 100 by using tools such as spanner or wrench.

Meanwhile, the pad 200 includes soft material, closely adhered to the head 120, and is in contact with a floor when the home appliance is mounted thereon.

The pad 200 is coupled with the head 120 by the holder 300, and includes an edge 210 and a center 220.

In this case, the edge 210 is fixed to the head 121, particularly the flat head 121 by the holder 300. The center 220 is more projected than the edge 210 in an opposite direction of a forwarding direction of the screw 110, and is in contact with the floor. In this case, it is desirable that the center 220 is thick enough to endure the weight of the home appliance because the center 220 is in contact with the floor when the home appliance is provided.

In the mean time, the holder 300 is formed in one piece and coupled with the head 120, and fixed in a state of pressing the pad toward the head 120.

Figure 6B:
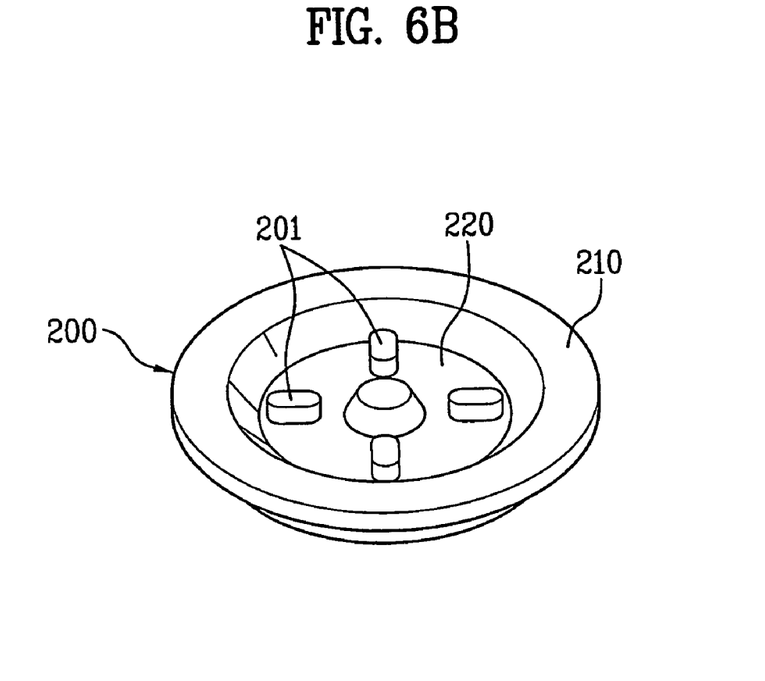
FIG. 6B illustrates a perspective view showing a pad of the-leg assembly in FIG. 3.
Figure 6C:
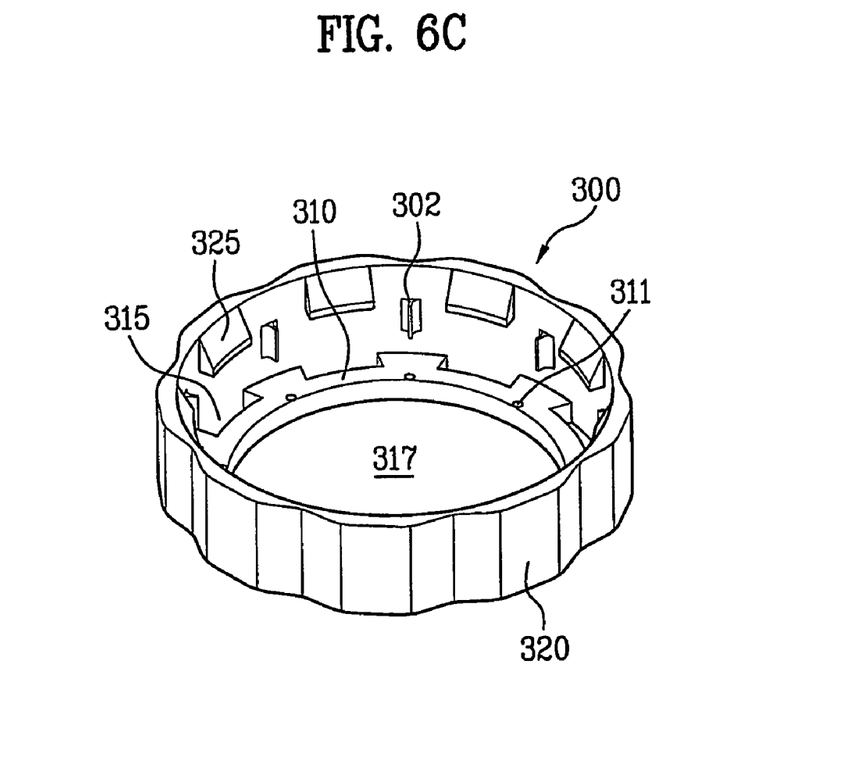
FIG. 6C illustrates a perspective view of a holder of the leg assembly in FIG. 3.

In the center of the, floor 310, a hole 317 passing the center 220 of the pad 200 is provided as illustrated in FIGS. 3 and 6c. As illustrated in FIG. 3, the floor 310 closely adheres the edge 210 of the pad 200 to the head 120, particularly the flat head 121 in a state that the holder 300 is coupled with the head 120.

The side wall 320 is perpendicularly extended in the forwarding direction of the screw on a circumferential surface of the floor 310. The side wall 320 covers the edge 210, the head 120, particularly the circumferential surface of the flat head 121 when the holder 300 is coupled with the head 120.

Meanwhile, a hook 325 is provided on the side wall 320 as illustrated in FIG. 6c. The hook 325 is caught by a side of the head 120, more particularly a side of the flat head 121 facing the screw 110 in a state that the floor 310 presses the edge 210 as illustrated in FIG. 3.

In this case, as illustrated in FIG. 6C the hook 325 is projected from an inner surface of the side wall 320 to an inner space of the holder 300, and a plurality of hooks are provided at same intervals on an inner surface of the side wall 320 so as to evenly press and fix the edge 210 of the pad 200. However, although it is not illustrated, the hook 325 can be extended not from the inner surface of the side wall 320 but from a top end [[Korean writing]] thereof.

It is desirable that distance between the floor 310 and the hook 325 is smaller than a sum of thickness of the edge 210 and thickness of the head 120, particularly thickness of the flat head 121, the thickness before being compressed by the holder 300, so as to stably fix the edge 210 of the pad 200.

Figure 4:
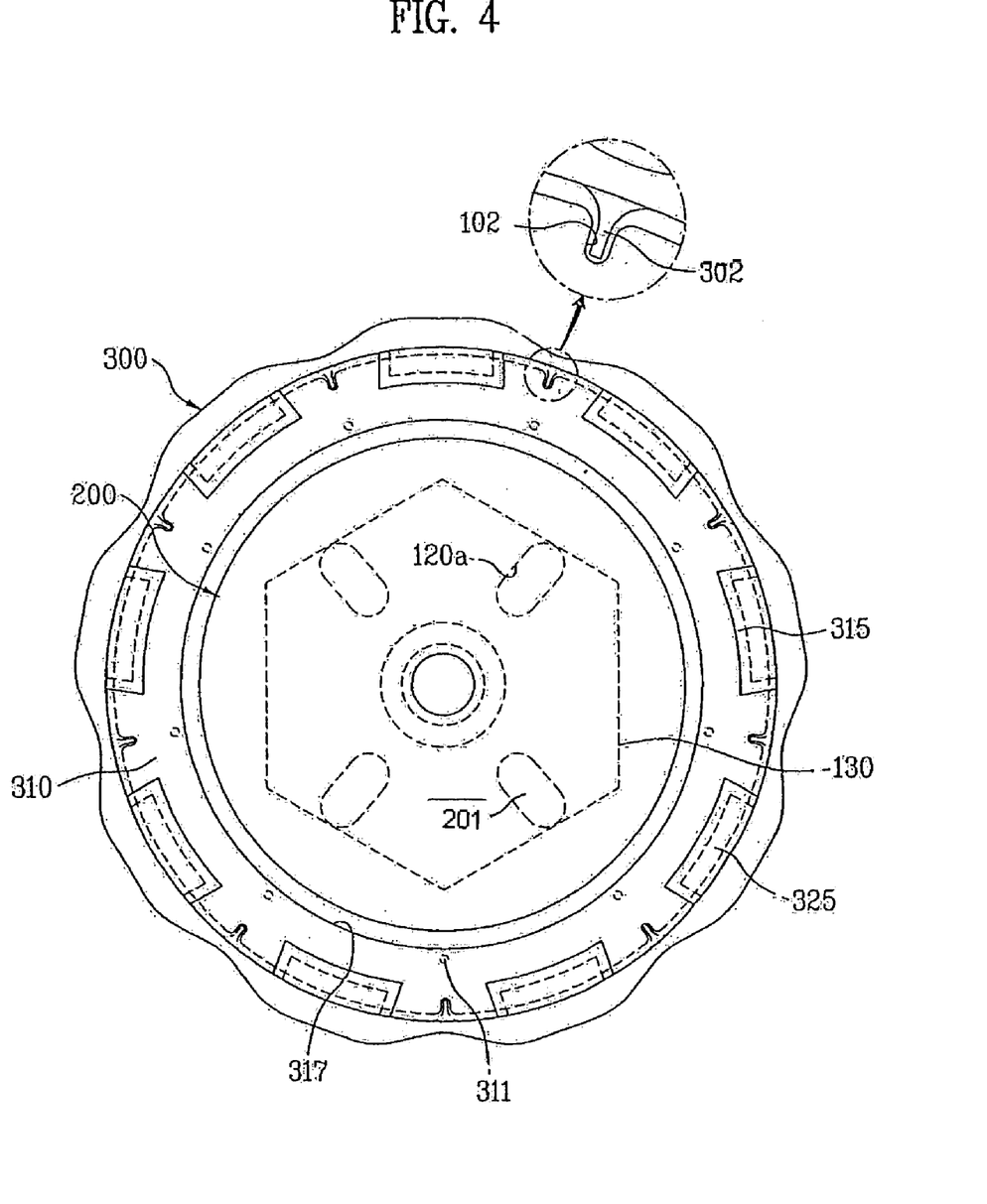
FIG. 4 illustrates a floor plan of the leg assembly in FIG. 3 shown from an "A" direction.

The leg assembly in accordance with the present invention further includes a structure wherein the holder 300 can press the edge 210 with a large amount of pressure. For this matter, at least one projection 311 is projected toward the pad 200 as illustrated in FIG. 4 and FIG. 6C.

It is desirable that a plurality of projection 311 is provided around the hole 317 at same intervals so as to evenly press the edge 210. However, the structure of the projection 311 is not limited to this. For example, the projection 311 can be provided in a projected ring form along the circumference of the hole 317.

Meanwhile, the hook 325 is extended to the inner space of the holder 300 from the inner surface of the side wall 320. Accordingly, a part of the side wall 320 from which the hook 325 is extended needs to be easily opened toward the outside of the holder 300 so as to easily couple the holder to the head 120. Therefore, the leg assembly in accordance with the present invention includes an opening 315 for the reason.

The opening 315 is provided at a coupling portion coupling the floor 310 of the holder 300 with the side wall. In this case, it is desirable that the opening 315 is provided at an area of the hook 325 projected, i.e., on a perpendicular projection area of the hook 325 at the coupling portion coupling the floor 310 with the side wall such that a part of the side wall 320 having the hook 325 is easily opened.

The holder 300 having the abovementioned structure covers the edge 210 and the leg bolt 100 except the center 220 of the pad 200. Therefore, when the worker assembles the leg assembly to a home appliance, it is convenient to rotate the leg assembly by grasping the outer circumference of the holder 300 by a hand or a tool if necessary.

Therefore, if the holder 300 is made of a hard material having an angled outer circumferential surface, the pad including rubber butyl material has softer and better appearance than the typical leg assembly exposed outside.

In the mean time, the holder 300 fixes the head 120 of the leg bolt 100 and the pad 200, the head 120 of the leg bolt 100 and the pad 200 being just simply in contact with each other. Therefore, when position of the home appliance is moved or height of the appliance is adjusted, there is a possibility that the pad 200 is slipped from the head 120 or rotated thereon.

Therefore, a first rotation protector is provided for preventing the pad 200 from being rotated in the present invention. The first rotation protector is provided at the head 120 and the pad 200, and the pad 200 prevents the head 120 from being slipped or rotated. The first rotation protector includes a projection 201 inserted into a groove 101. The projection 201 will be described in more detail as follows.

The groove 101 is provided on at least one of either the pad 200 or the head 120, particularly the platform 125. The projection 201 is inserted into the groove 101, and at least one projection 201 is provided on at least one of either the head 120 particularly the platform 125, or the pad 200.

As a reference, FIG. 6A and FIG. 6B illustrate an example showing a plurality of grooves 101 provided to a platform 125 of the head 120 and a plurality of projection 201 provided to the pad 200. However, it is not limited to this. For example, the grove 101 can be provided to the pad 200 and the projection 201 can be provided to the head 120, or both the groove 101 and the projection 201 can be provided to the pad 200 and the head 120.

Meanwhile, it is desirable that the groove 101 and the projection 201 are arranged to deviate from the rotation center of the leg bolt 100 [[Korean writing]] for effectively protecting the pad 200 from being rotated from the head 120, and formed in a long form in the radius direction of the pad 200. However, if provided to deviate from the rotation center of the leg bolt 100, the groove 101 and the projection 201 may be formed in a round form.

When the groove 101 and the projection 201 are provided to the head 120 and the pad 200, not only slipping and rotation of the pad 200 are prevented but also the leg assembly is easily assembled. In more detail, when the leg assembly is assembled, the projection 201 and the groove 101 exactly determine a location for coupling the pad 200 and the head 120. When the projection 201 is inserted into the groove 101, the worker can easily couple the holder 300 to the pad 200 and the leg bolt 100 because the pad 200 is temporarily attached to the head 120.

Meanwhile, when the user rotates the leg bolt 100 by grasping the holder 300, it is desirable that the holder 300 is not rotated around the head 120. Therefore, the leg assembly in accordance with the present invention includes a second rotation protector for preventing the rotation around the flat head 121. The second rotation protector includes a groove 102 and a projection 302 provided at the head 120 and the holder 300, which will be described in more detail hereinafter.

First, the groove 102 is provided to at least one of either the head 120, particularly the circumferential surface, or the inner surface of the flat head 121. The projection 302 is inserted into the groove 102 and provided to at least one of either the head 120, particularly the circumferential surface of the flat head 121, or the inner surface of the holder 300.

As a reference, FIG. 6A and FIG. 6C illustrate examples showing a plurality of groove 102 is provided at same intervals on the circumferential surface of the flat head 121 and a plurality of projection 302 is provided on inner circumference of the holder 300, particularly on the inner surface of the side wall 320. Herein, the projection 302 provided between the hooks 325 is illustrated.

In this case, the groove 102 is formed in a long slot form in an up and down direction for effectively preventing the holder 300 is rotated around the flat head 121, and the projection 302 is formed in a long form in the up and down direction. When the groove 102 and the projection 302 are formed as abovementioned, not only the rotation of the holder 300 is prevented but also it is easy to assemble because the projection 302 slips along the groove 102 when the holder is assembled to the head 120.

Meanwhile, when the leg assembly having the structure abovementioned in accordance with the present invention is assembled, the pad 200 is closely adhered to the head 120, and then the holder 300 is assembled to the head 120. Hereinafter, the structure will be described in more detail.

First, when the pad 200 is closely adhered to the head 120 the projection 201 of the pad 200 is inserted in to the groove 101 of the platform 125, the center 220 of the pad 200 is closely adhered to the platform 125, and the edge 210 of the pad 200 is closely adhered to the edge 210 of the pad 200.

In a state that the pad 200 is closely adhered to the head 120, the holder 300 is assembled to the head 120. In this instance, the holder 300 is strongly pushed from the head 120 to the screw 110 the floor 310 of the holder 300 such that the floor 310 of the holder 300 is closely adhered to the edge 210 of the pad 200.

Then, the center 220 of the pad 200 passes thorough a hole 317 of the holder 300, and the hook 325 moves forward along the circumferential surface of the flat head 121 in a state that a part of the side wall 320 is opened and caught by a side of the flat head 121 to be fixed as illustrated in FIG. 3.

As aforementioned, when the holder 300 is fixed to the head 120, the pad 200 is stably fixed to the head 120 because the floor 310 of the holder 300 and the projection 311 provided on the floor 310 closely adhere the edge 210 of the pad 200 to the pad 200.

The projection 201 and the groove 101 provided at the pad 200 and the head 120 prevent the pad 200 from being slipped or rotated on the head 120. Furthermore, the groove 102 and the projection 302 provided at the head 120 and the holder 300 prevent the holder 300 from being rotate on the head 120.

In addition, the hook 325 is not separated from the flat head 121 because the side wall 320 is not easily opened in a state that the holder 300 is s assembled into the head 120. Therefore, the leg bolt 100 and the pad 200 and the holder 300 become a very solid leg assembly.

When the holder 300, pad 200, and the head 120 are all assembled, the center 220 of the pad 200 passes through the hole 317 of the holder 300 to be exposed outside. Therefore, the screw 110 is coupled with the edge of the home appliance, and the center 220 of the pad 200 is in contact with the floor when the home appliance is mounted.

Second Embodiment

Figure 7:
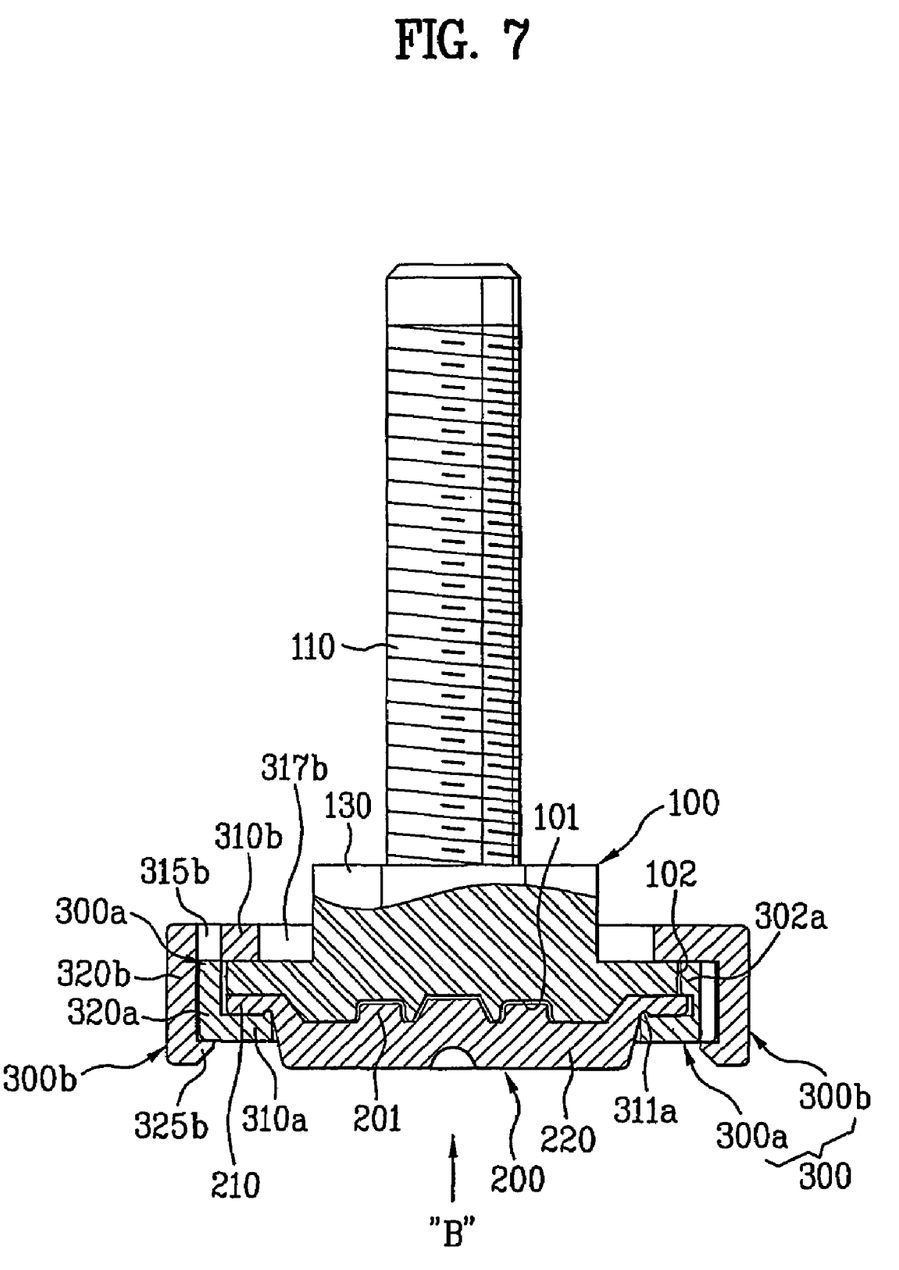
FIG. 7 illustrates a view showing a leg assembly in accordance with a second embodiment of the present invention.

As illustrated in FIG. 7, the leg assembly in accordance with the second embodiment of the present invention includes a holder 300 having a leg bolt 100, a pad 200, and an inner holder 300*a* and an outer holder 300*b*. In this case, the structure of the leg bolt 100 and the pad 200 are same as illustrated in FIG. 6*a* and FIG.6*b*. However, the structure of the leg bolt 100 and the pad 200 illustrated in FIGS. 6*a* and 6*b* is described enough in the description of the first embodiment of the present invention.

Therefore, the description of the leg bolt 100 and the pad will be omitted, and hereinafter, the holder 300 including the inner holder 300*a* and the outer holder 300*b* will only be described. As a reference, same reference numbers used in the first embodiment of the present invention will be used for the leg bolt 100 and the pad 200.

Contrary to the holder including one piece in the first embodiment, the holder 300 in accordance with the second embodiment includes two sectional pieces, i.e., the inner holder 300*a* and the outer holder 300*b*.

The inner holder 300*a* and the outer holder 300*b* are assembled to cover the head 120 from both sides of the head 120, i.e., a screw facing side and an opposite side of the screw facing side so as to stably fix the pad 200 to the head 120. Hereinafter, the structure of the inner holder 300*a* and the outer holder 300*b* will be described in more detail referring to FIG. 7 to FIG. 10B.

The inner holder 300*a* includes one piece, and is provided to cover the ledge 210 of the pad 200 as illustrated in FIG. 7. The inner holder 300*a* is coupled with the head 120 from a side adjacent to the pad 200 as illustrated in FIG. 9, and includes a first floor 310*a* and a first side wall 320*a* as illustrated in FIG. 10A.

Figure 9:
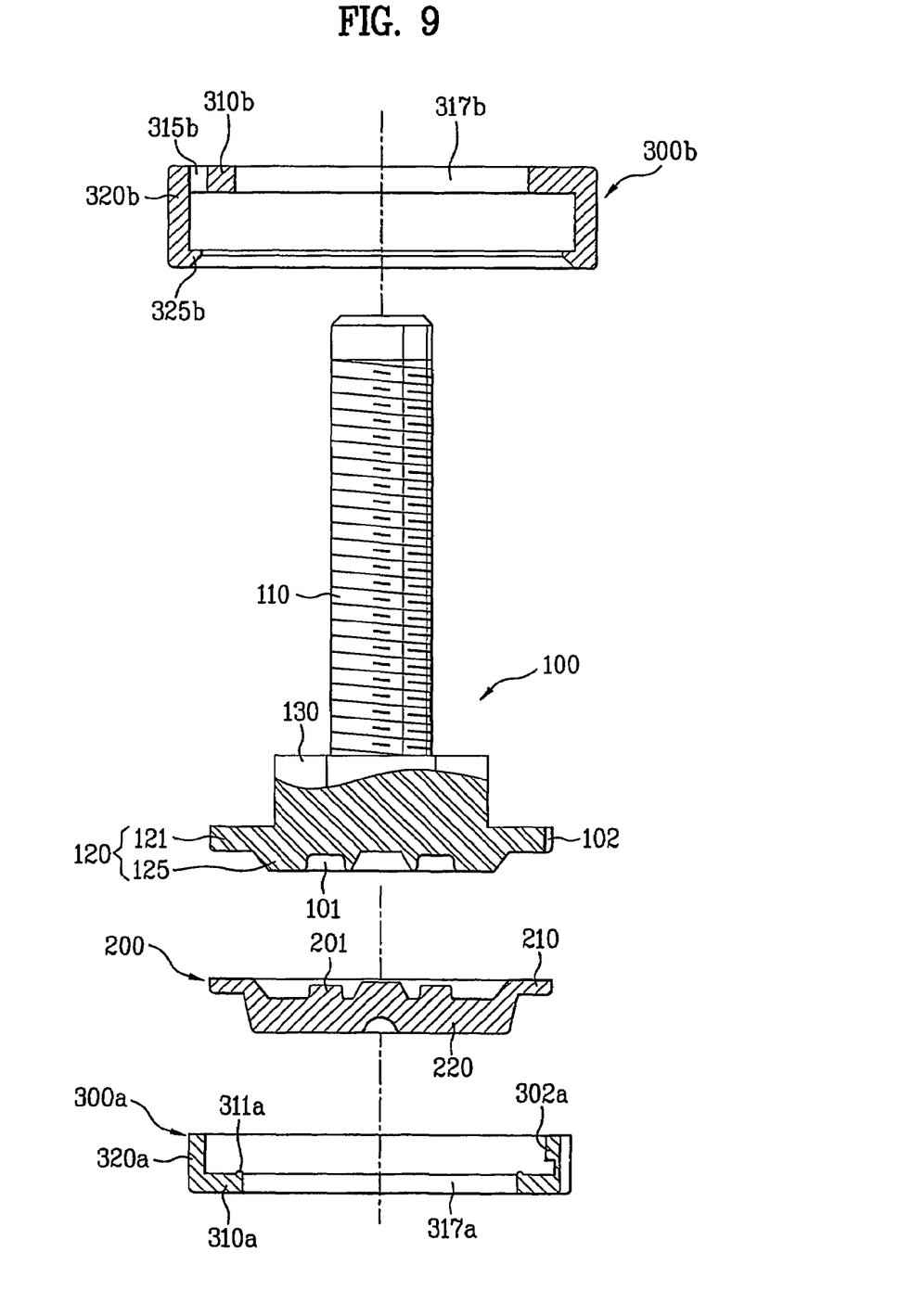
FIG. 9 illustrates an exploded cross-sectional view of the leg assembly in FIG. 7.
Figure 10A:
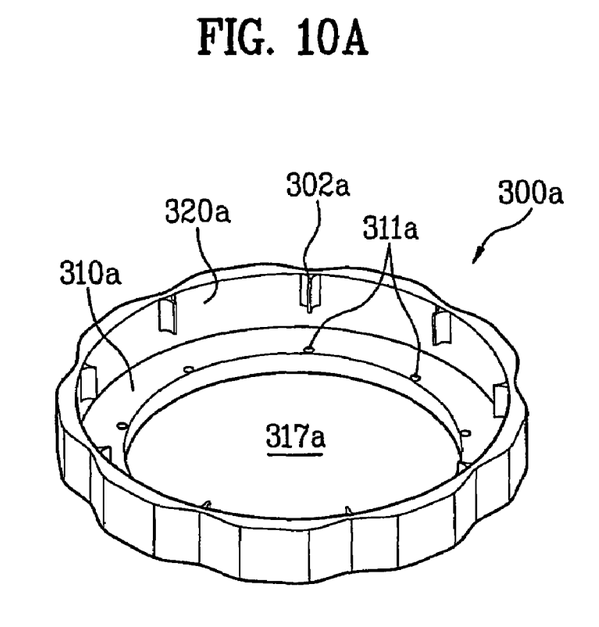
FIG. 10A illustrates a perspective view showing an inner holder of the leg assembly in FIG. 7.

In center of the first floor, a hole 317*a* passing through the center 220 of the pad 200 is provided as illustrated in FIG. 9 and FIG. 10A. When the outer holder 300*b*, the inner holder 300*a* and the head 120 are coupled together, the first floor 310*a* closely adheres the edge 210 of the pad 200 to the head 120, particularly to the flat head 121.

The first side wall 320*a* is perpendicularly extended from the circumferential surface of the first floor 310*a* to a forwarding direction of the screw 110. The first side wall 320*a* covers the circumferential surface of the edge 210 when the outer holder 300*b*, the inner holder 300*a* and the head 120 are coupled together. In case the first side wall 320*a* is formed in a log form, not only the circumferential surface of the edge 210 but also the head 120 particularly the flat head 121 are covered.

In addition, the leg assembly in accordance with the second embodiment further includes a structure that the inner holder 300*a* presses the edge 210 with a large pressure. For the matter, at least one projection 311*a* is projected to the pad 200 on the first floor 310*a* being in contact with the edge 210 of the pad 200.

It is desirable that a plurality of projection 311*a* is provided around the hole 317*a* at same intervals for evenly pressing the edge 210. However, the structure of the projection 311*a* is not limited to this. For example, the projection 31l*a* can be projected in a ring form along the circumference of the hole 317*a*.

Figure 10B:
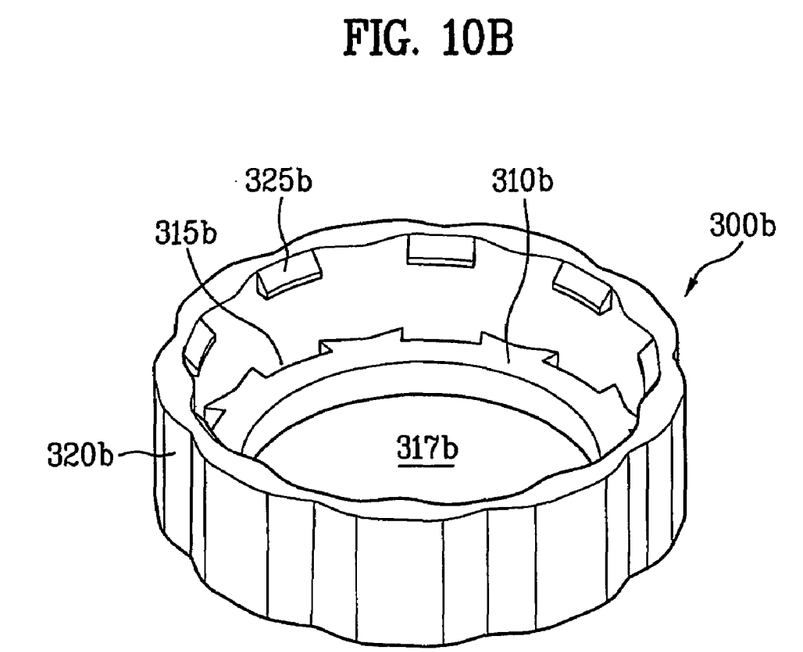
FIG. 10B illustrates a perspective view showing an outer holder of the leg assembly in FIG. 7.

Meanwhile, the outer holder 300*b* includes one piece, and a first side of the outer holder 300*b* supports the head 120, particularly the flat head 121, and a second side thereof is supported by the inner holder 300*a*. The outer holder 300*b* is coupled with the head 120 on the screw side, and includes a second floor 310*b*, a second side wall 320*b*, and a hook 325*b* as illustrated in FIG. 10. Hereinafter, the outer holder will be described in more detail.

In the center of the second floor 310*b*, the hole 317*b* through which the screw 110 passing is provided as illustrated in FIG. 9 and FIG. 10B. In this case, if the angled head 130 is provided between the screw 110 and the flat head 121, the hole 317*b* is formed in a large size enough to allow the angled head passing therethrough. The second floor 320 is supported by a side of the head 120, particularly a side of the flat head 121 when coupled with the inner holder 300*a*, the outer holder 300*b*, and the head 120.

The second side wall 320*b* is perpendicularly extended from a circumferential surface of the floor 310 in the forwarding direction of the screw 110. Therefore, the second side wall covers the first side wall 320*a* of the inner holder 300*a* when the outer holder 300*b*, the inner holder 300*a*, and the head 120 are coupled each other.

Meanwhile, the hook 325*b* is provided on the inner surface of the second side wall as illustrated FIG. 10B. The hook 325*b* is caught and supported by the inner holder 300*a* in a state that the inner holder presses the edge 210 of the pad 200 as illustrated in FIG. 7.

In this case, the hook 325*b* is projected from the inner surface of the side wall 320*b* to an inner space of the outer holder 300*b* as illustrated in FIG. 10*b*, and a plurality of hook 325*b* is provided at same intervals on the inner surface of the second side wall 320*b* such that he first floor 310 of the inner holder 300*a* evenly presses and fixes the edge 210 of the pad 200. However, although not illustrated, the second hook 325*b* can be extended not from the inner surface of the second side wall but from a top end thereof.

Furthermore, it is desirable that distance between the second floor 310*b* and the second hook 325*b* is smaller than a sum of thickness of the edge 210 and thickness of the head 120, particularly thickness of the flat head 121, the thickness before being compressed by the holder 300, so as to stably fix the edge 210 of the pad 200.

In the mean time, since the hook 325*b* is projected from the inner surface of the second side wall 320*b* to the inner space of the outer holder 300*b*, a part of the side wall 320*b* from which the hook 325*b* is extended needs to be easily opened toward the outside of the holder 300*b* so as to easily couple the outer holder 300*b* to the head 120 and the inner holder 300*a*. Therefore, the leg assembly in accordance with the second embodiment of the present invention includes an opening 315*b* for the reason.

The opening 315*b* is provided at a coupling portion for coupling the second floor 310*b* of the holder 300*b* with the side wall 320*b*. In this case, for easily opening a side of the second side wall 320*b* having the second hook 325*b*, it is desirable that the opening 315*b* is provided at an area of the hook 325 projected, i.e., on a perpendicular projection plane of the hook 325 among the coupling portion coupling the floor 310 with the side wall such that a part of the side wall 320 having the hook 325 is easily opened.

The holder 300*b* having the abovementioned structure covers the head 120 of the leg bolt 100. Accordingly, when the worker assembles the leg assembly to a home appliance, it is convenient to rotate the leg assembly by grasping the outer circumferential surface of the holder 300*b* by a hand or a tool if necessary.

Figure 8:
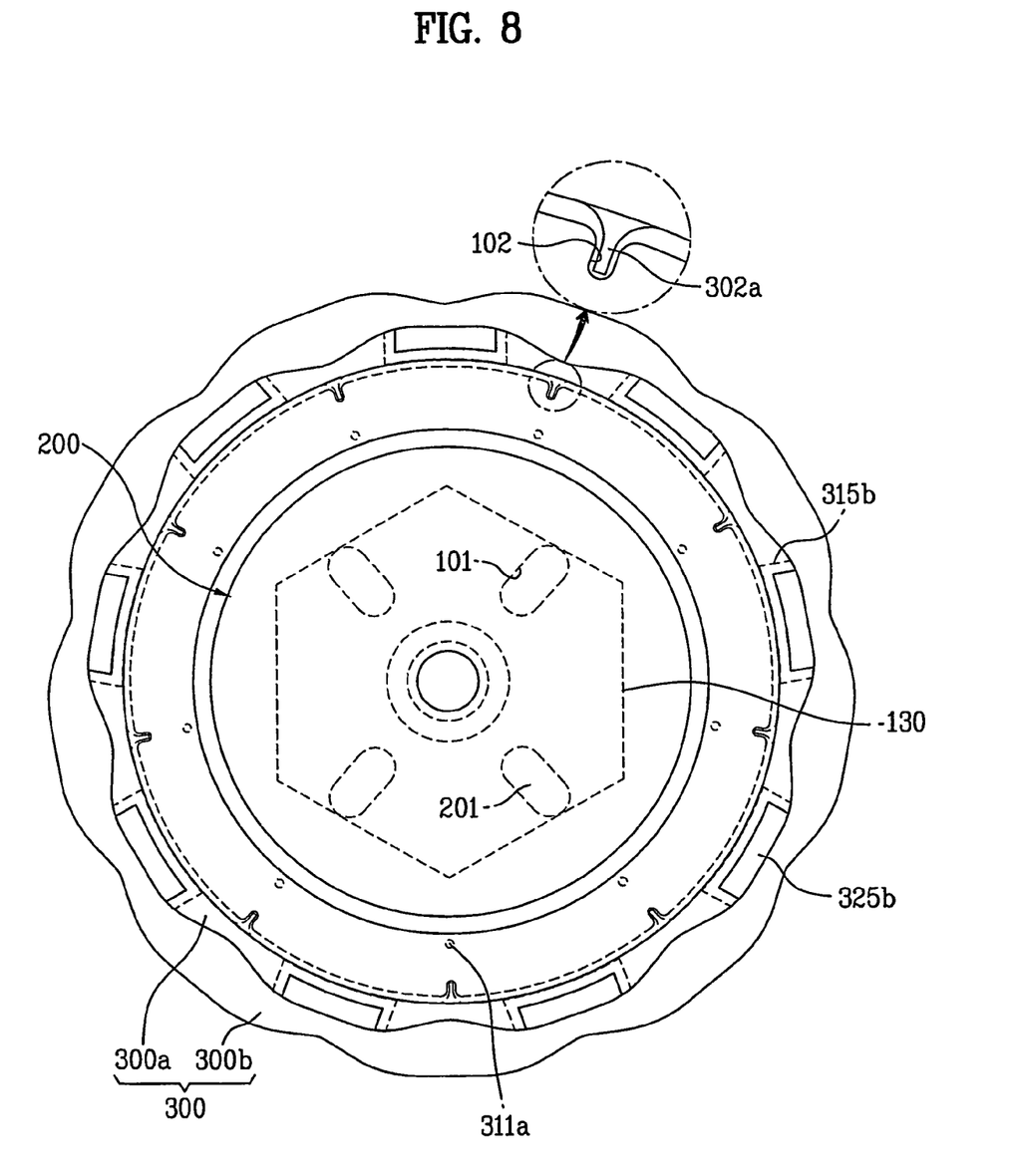
FIG. 8 illustrates a floor plan of the leg assembly in FIG. 7, shown from a "B" direction.

Therefore, it is desirable that the second holder 300*b* is made of a hard material having an angled outer circumferential surface for allowing the worker easily grasping the outer circumferential surface thereof by a hand or a tool as illustrated in FIGS. 8 and 10B. In this case, an edge portion of the angled outer circumferential surface is rounded as illustrated in FIG. 8.

As aforementioned, if the outer holder 300*b* is made of the hard material and has the angled outer circumferential surface, the pad including rubber butyl material has softer and better appearance than the typical leg assembly exposed outside.

In the mean time, the leg assembly in accordance with the second embodiment of the present invention includes a third rotation protector for preventing the inner holder 300*a* from being rotated on the head 120, particularly the flat head 121. The third rotation protector includes a groove 102 and a projection 302*a* provided at the head 120 and the inner holder 300*a*, which will be described in more detail.

First, the groove 102 is provided at the head 120, particularly at least one of either an outer circumferential surface of the flat head 121 or an inner surface of the inner holder 300*a*. The projection being inserted into the grove 102 is provided at the head 120, particularly at least one of either the outer circumferential surface of the flat head 121 or the inner surface of the inner holder 300*a*.

As a reference, a plurality of groove 102 is provided on the outer circumferential surface of the head 121 at same intervals. FIG. 8 and FIG. 10A illustrate an example showing the plurality of groove 102 is provided on the inner surface, particularly the inner surface of the first side wall 320*a* at same intervals.

In this case, the groove 102 is formed in a long slit or slot form, and the projection 302*a* is formed in a long form in up and down direction so as to effectively prevent the inner holder 300*a* from being rotated on the flat head 121. When the groove 102 and the projection 302*a* are formed as abovementioned, not only the rotation of the inner holder 300*a* is prevented but also it is easy to assemble because the projection 302*a* is slipped along the groove 102 when the inner holder 300*a* is inserted into the head 120.

The leg assembly in accordance with the second embodiment of the present includes a fourth rotation protector for preventing the outer holder 300*b* from being rotated on the inner holder 300*a*. In this case, the fourth rotation protector includes an angled outer circumferential surface of the inner holder 300*a* and an angled inner circumferential surface of the outer holder 300*b* as illustrated in FIG. 10B.

In this case, it is desirable that the inner holder 300*a* and the outer holder 300*b* are made of the hard material and the angled inner circumferential surface of the outer holder 300*b* is geared to the angled outer circumferential surface of the inner holder 300*a* as illustrated in FIG. 8. Therefore, both the inner holder and the outer holder of the outer holder 300*b* have the angled surface.

When the holder 300*a* and the outer holder 300*b* are structured as abovementioned, the worker can easily grasp and rotate the angled outer circumferential surface of the outer holder 300*b* by hands or tools. In this case, the outer holder 300*b* doe not run idle but rotates with the inner holder 300*b* and the head 120.

In the mean time, when the leg assembly having the aforementioned structure is assembled in accordance with the second embodiment, the pad 200 is closely adhered to the head 120 of the leg bolt 100, and then the inner holder 300*a* and the outer holder 300*b* are coupled each other at both sides of the head 120.

In a state that the first floor 310*a* of the inner holder 300*a* is closed adhered to the pad 200, the outer holder 300*b* is coupled with the inner holder 300*a* as forwarding from the screw side toward the pad 200.

In this instance, the hook 325b moves along the outer circumferential surface of the first side wall 320a of the inner holder 300a, and is caught by the first floor 310a of the inner holder 300a to be supported in a state that the second side wall 320b of the outer holder 300b is slightly opened.

Then, when the inner holder 300a, the outer holder 300b, the pad 200 and the head are assembled, the first floor 310a of the inner holder 300a and the projection 311a provided on the first floor 310a closely adhere the edge 210 of the pad 200 to the pad 200, and thus the pad 200 is stable fixed thereto. Moreover, the projection 201 and the groove 101 provided to the pad 200 and the head 120 prevents the head 120 from being slipped or rotated on the head 120.

Upon assembling the inner holder 300a, the outer holder 300b, the pad 200 and the head 120, the third rotation protector and the fourth rotation protector prevent the inner holder 300a and the outer holder 300b from being run idle. Furthermore, the hook 325b is not separated from the first floor 310a because the second side wall 320b of the outer holder 300b is not easily opened in a state that the outer holder 300b is assembled to the inner holder 300a and the head 120. Therefore, the leg bolt 100, the pad 200 and the holder 300 become a very solid leg assembly.

Furthermore, when the inner holder 300a, the outer holder 300b, the pad 200 and the head 120 are assembled, the screw 110 passes through the hole 317b of the outer holder 300b to be exposed to outside, and the center 220 of the pad 200 pass through the hole 317a of the inner holder 300a to be exposed outside. Therefore, the screw 110 is coupled with the lower edge of the home appliance and the center 220 of the pad 200 is in contact with the floor.

Meanwhile, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

When the leg assembly in accordance with the present invention is applied to electric home appliances such as a washing machine, a clothes dryer, a refrigerator, and a dishwasher, the vibration generated from the electric home appliances is effectively reduced by the leg assembly.

The leg assembly in accordance with the present invention may be manufactured by a simply assembling, without processes of spraying an adhesive and molding for attaching a pad to a leg bolt. Therefore, the productivity is more improved than a typical leg.

In addition, since not only is the holder a hard material but it has an angled outer circumference, it is very easy to assemble the leg assembly to the electric home appliances. Furthermore, since the holder exposed outside is made of the hard material and has a smooth surface, beautiful external appearance is obtained when the electric home appliances are provided.

What is claimed is:

1. A leg assembly for electric home appliances, comprising:
    a leg bolt having a screw and a head provided at an end thereof;
    a pad made of a soft material, the pad closely adhered to the head and being in contact with a floor;
    at least one holder coupled with the head and fixing the head and the pad by pressing the pad to the head;
    an angled head provided between the screw and the head and having an angled outer circumferential surface;
    at least one groove provided on at least one of either the head or the pad; and
    a projection provided on at least one of either the head or the pad, and inserted into the groove, and
    wherein the groove and projection are arranged to deviate from the rotation center of the leg bolt.

2. The leg assembly claimed in the claim 1, wherein the head comprises:
    a flat head provided at an end of the screw; and
    a platform projected from a center of the flat head.

3. The leg assembly for electric home appliances claimed in the claim 2, wherein the flat head is formed in a round plate form.

4. The leg assembly for electric home appliances claimed in the claim 1, wherein the pad comprises:
    an edge fixed to the head by the holder; and
    a center more projected than the edge and being in contact with the floor.

5. The leg assembly for electric home appliances claimed in the claim 1, wherein the groove and the projection are provided in a long form.

6. The leg assembly for electric home appliances claimed in the claim 1, wherein the groove and the projection are separately provided from a rotation center of the leg bolt.

7. The leg assembly for electric home appliances claimed in the claim 1, further comprising:
    at least one groove provided on at least one of either a circumferential surface of the head or an inner surface of the holder; and
    at least one projection provided on at least one of either the circumferential surface of the head or the inner surface of the holder, and inserted into the groove.

8. The leg assembly for electric home appliances claimed in the claim 7, wherein the holder comprises:
    a through hole adapted to pass a center portion of the pad;
    a side wall;
    a bottom closely adhered to an edge of the pad; and
    a plurality of hooks extended from an inner surface of the side wall and caught by a side of the head and supported in a state that the bottom presses the edge; and
    wherein the groove or the projection is provided between the hooks.

9. The leg assembly for electric-home appliances claimed in the claim 1, the holder comprises:
    a through hole adapted to pass a center portion of the pad;
    a side wall;
    a bottom closely adhered to an edge of the pad; and
    a plurality of hooks extended from an inner surface of the side wall and caught by a side of the head and supported in a state that the bottom presses the edge.

10. The leg assembly for electric home appliances claimed in the claim 9, wherein the hook is projected from the inner surface of the side wall to the inner space of the holder.

11. The leg assembly for electric home appliances claimed in the claim 9, wherein distance between the bottom and the hook is smaller than a sum of thickness of the edge and thickness of the head.

12. The leg assembly for electric home appliances claimed in the claim 9, wherein the holder further comprises at least one projection projected from the bottom for pressing the edge with a large pressure.

13. The leg assembly for electric home appliances claimed in the claim 12, wherein a plurality of the projections is arranged around the through hole at same interval.

14. The leg assembly for electric home appliances claimed in the claim 1, wherein the holder is made of a hard material and has an angled outer circumferential surface.

15. The leg assembly for electric home appliances claimed in the claim 9, wherein the holder further comprises an opening provided at a coupling part of the bottom and the side wall for easily opening a portion of the side wall, the portion having the hook, when the holder is assembled to the head.

16. The leg assembly for electric home appliances claimed in the claim 15, wherein the opening is provided on a perpendicular projection area of the hook.

17. The leg assembly for electric home appliances claimed in the claim 15, wherein the holder comprises an inner holder and an outer holder assembled at both sides of the head and fixing the pad to the head.

18. The leg assembly for electric home appliances claimed in the claim 15, wherein the inner holder is provided to the edge of the pad, and a first side of the outer holder supports the head and a second side of thereof supports the inner holder.

19. The leg assembly for electric home appliances claimed in the claim 15, further comprising:
   at least one groove provided on at least one of either the circumferential surface of the head or the inner surface of the inner holder; and
   at least one projection provided on at least one of either the circumferential surface of the head or the inner surface of the inner holder.

20. The leg assembly for electric home appliances claimed in the claim 17, wherein the inner holder is made of a hard material and has an angled outer circumferential surface.

21. The leg assembly for electric home appliances claimed in the claim 20, wherein the outer holder is made of a hard material and has an angled inner circumferential surface, the angled inner surface being engaged with the angled outer circumferential surface of the inner holder.

22. The leg assembly for electric home appliances claimed in the claim 17, wherein the outer holder is made of a hard material and having an angled outer circumferential surface.

23. The leg assembly for electric home appliances claimed in the claim 17, wherein the inner holder comprises:
   a through hole through which the center of the pad passes through in a middle thereof;
   a bottom covering the edge of the pad; and
   a side wall extended from a circumference of the bottom and covering the outer circumferential surface of the pad and the head.

24. The leg assembly for electric home appliances claimed in the claim 23, wherein the inner holder further comprises at least one projection projected from the bottom for pressing the edge with a large pressure.

25. The leg assembly for electric home appliances claimed in the claim 24, wherein a plurality of projections is arrayed around the through hole at same intervals.

26. The leg assembly for electric home appliances claimed in the claim 17, wherein the outer holder comprises:
   a bottom having a through hole through which the screw passes in a center thereof, and being supported by a side of the head; and
   a side wall extended from the circumferential surface of the bottom and having a plurality of hooks being supported by the inner holder in a state that the inner holder presses the edge of the pad.

27. The leg assembly for electric home appliances claimed in the claim 26, wherein the hook is projected from the inner surface of the side wall to the inner space of the outer holder.

28. The leg assembly for electric home appliances claimed in the claim 26, wherein distance between the bottom and the hook is smaller than a sum of thickness of the edge and thickness of the head.

29. The leg assembly for electric home appliances claimed in the claim 26, wherein the outer holder comprises at least one opening provided at a coupling part of the bottom and the side wall.

30. The leg assembly for electric home appliances claimed in the claim 29, wherein the opening is provided on a perpendicular projection area of the hook.

31. A leg assembly for electric home appliances, comprising:
   a leg bolt having a screw and a head having a flat head provided at an end of the screw and a platform projected from the center of the flat head;
   a pad, made of a soft material, including an edge fixed at the flat head, and a center portion closely adhered to the platform, more projected than the edge, and being in contact with a floor; and
   a holder having a side wall, the side wall including a bottom having a through hole through which the center portion of the pad passes in a center thereof, a floor closed adhering the edge to the flat head, and a plurality of hooks extended from the bottom and caught to be supported by a side of the head in a state that the bottom presses the edge.

32. The leg assembly for electric home appliances claimed in the claim 31, wherein the holder is made of a soft material and has an angled outer circumferential surface.

33. The leg assembly for electric home appliances claimed in the claim 31, wherein the holder further comprises at least one projection projected from the bottom for pressing the edge with a large pressure.

34. The leg assembly for electric home appliances claimed in the claim 31, further comprising a first rotation protector provided between the head and the pad for preventing the pad from being rotated on the head.

35. The leg assembly for electric home appliances claimed in the claim 34, wherein the first rotation protector comprises:
   at least one groove provided at least one of either the platform or the center; and
   at least one projection provided at least one of either the platform or the center, and inserted into the groove.

36. The leg assembly for electric home appliances claimed in the claim 31, further comprising a second rotation protector provided at the head and the holder for preventing the holder from being rotated on the head.

37. The leg assembly for electric home appliances claimed in the claim 36, wherein the second rotation protector comprises:
   at least one groove provided on at least one of either the circumferential surface of the flat head or the inner surface of the side wall; and
   at least one projection provided on at least one of either the circumferential surface of the flat head or the inner surface of the side wall, and inserted into the groove.

38. The leg assembly for electric home appliances claimed in the claim 31, further comprising an opening provided at a coupling part of the bottom and the side wall of the holder for easily opening a portion of the side wall of the holder, the portion having the hook, when the holder is assembled to the head.

39. A leg assembly for electric home appliances, comprising:

a leg bolt having a screw and a head having a flat head provided at an end of the screw and a platform projected from the center of the flat head;

a pad, made of a soft material, including an edge fixed at the flat head of the leg bolt, and a center portion closely adhered to the platform, more projected than the edge, and being in contact with a floor; and an inner holder including a first side wall including a hole through which the center portion of the pad passes in a center thereof, a first bottom having for covering the edge of the pad, and a first side wall extended from a circumferential surface of the first bottom and covering the pad and the circumferential surface of the head; and an outer holder including a second side wall having a second bottom and a plurality of hooks, the second bottom having a hole through which the screw passes in a center thereof and supporting a side of the head, and the plurality of hooks extended from the circumferential surface of the second side wall and supporting the inner holder in a state that the inner holder presses the edge.

40. The leg assembly for electric home appliances claimed in the claim 39, wherein the outer holder is made of a hard material and having an angled outer circumferential surface.

41. The leg assembly for electric home appliances claimed in the claim 39, further comprising a first rotation protector provided between the head and the pad for preventing the pad from being rotated on the head.

42. The leg assembly for electric home appliances claimed in the claim 41, wherein the first rotation protector comprises:

at least one groove provided to at least one of either the platform or the center; and at least one projection provided to at least one of either the platform or the center, and inserted into the groove.

43. The leg assembly for electric home appliances claimed in the claim 39, further comprising a second rotation protector provided at the head and the inner holder for preventing the inner holder from being rotated on the head.

44. The leg assembly for electric home appliances claimed in the claim 43, wherein the third rotation protector comprises:

at least one groove provided on at least one of either the circumferential surface of the flat head or the inner surface of the side wall; and at least one projection provided on at least one of either the circumferential surface of the flat head or the inner surface of the side wall, and inserted into the groove.

45. The leg assembly for electric home appliances claimed in the claim 39, further comprising a fourth rotation protector provided at the holder and the outer holder for preventing the outer holder from being rotated on the inner holder.

46. The leg assembly for electric home appliances claimed in the claim 45, wherein the fourth rotation protector comprises an angled outer circumferential surface provided at the inner holder; and an angled inner circumferential surface provided at the outer holder for being engaged with the angled outer circumferential surface of the inner holder.

47. The leg assembly for electric home appliances claimed in the claim 39, further comprising an opening provided at a coupling part of the bottom and the side wall for easily opening a portion of the side wall, the portion having the hook, when the holder is assembled to the head.

* * * * *